Patented May 4, 1954

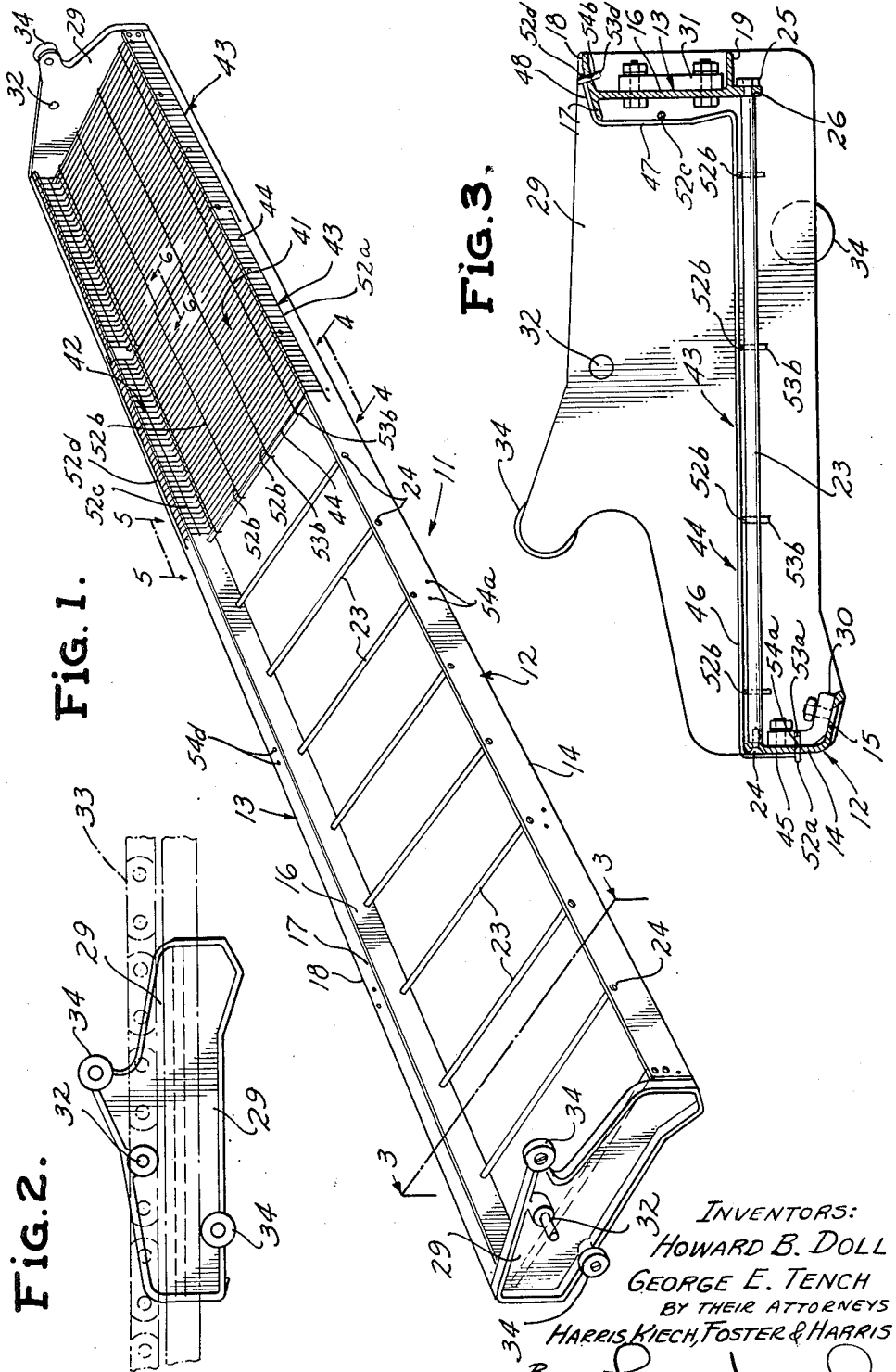

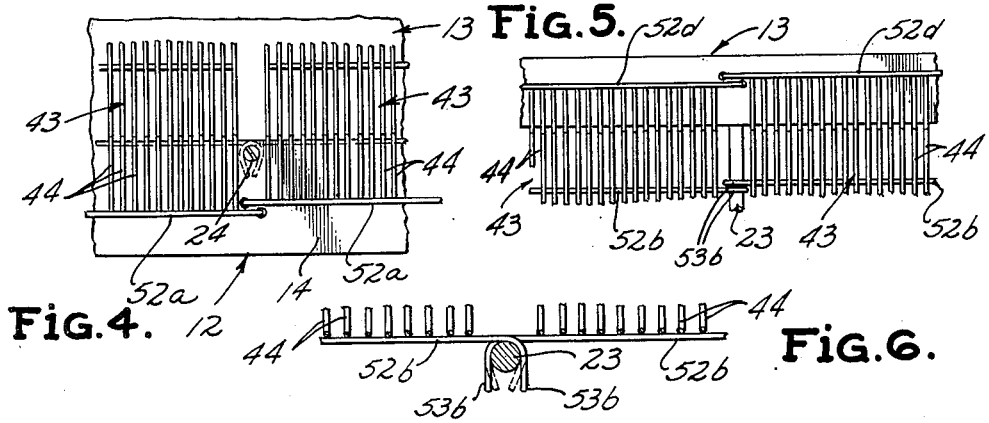
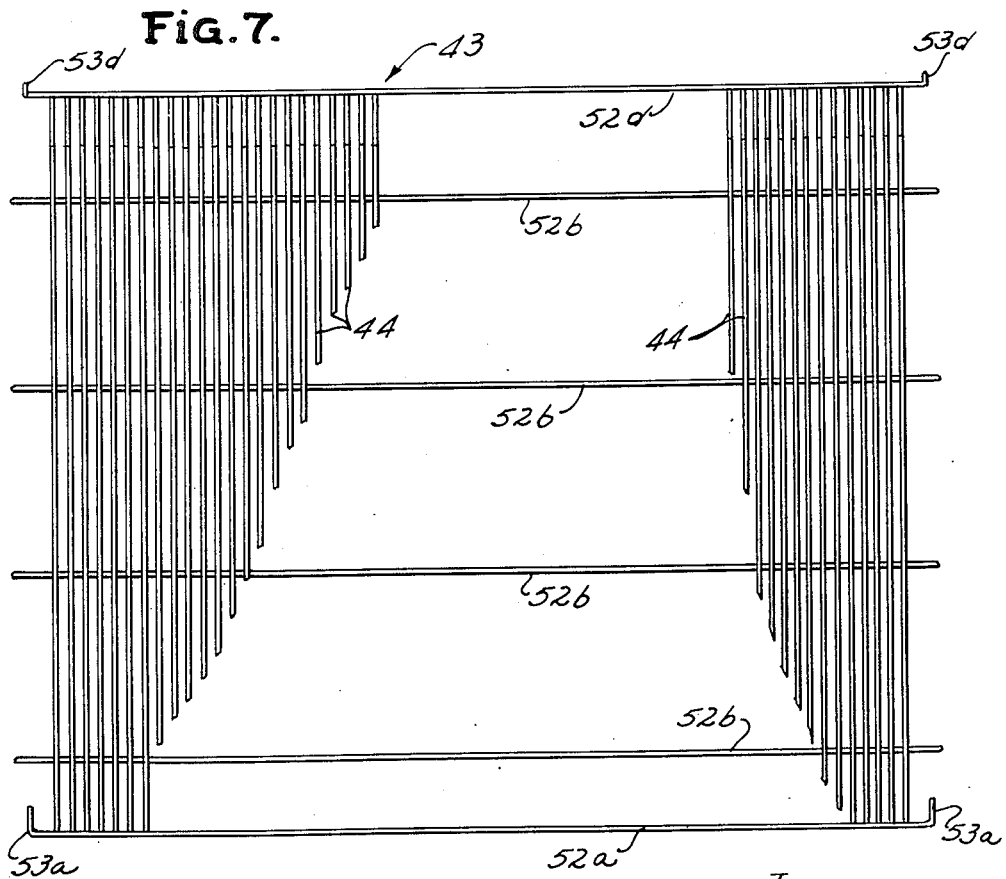

2,677,198

UNITED STATES PATENT OFFICE 2,677,198

BREAD COOLING TRAY

Howard B. Doll, Los Angeles, and George E. Tench, South Pasadena, Calif., assignors to Read Standard Corporation, a corporation of Delaware Application February 23, 1951, Serial No. 212,336

8 Claims. (Cl. 34—238)

The present invention relates to a tray for supporting such baked goods as loaves of bread while the loaves are being cooled after removal from an oven.

In order to provide bread which will keep for several days without drying out in response to public demand, many bakeries have materially increasd the moisture content of bread in recent years. As a matter of fact, the moisture content of a great deal of the bread sold today is so high that, in many instances, the loaves sweat considerably as they are cooled after baking, such sweating being the result of exudation of moisture from the interiors of the loaves.

The bread cooling trays employed heretofore included supporting surfaces for the loaves of bread which were provided with supporting elements of large area and mass. As is well known in the baking industry, when loaves which tend to sweat because of their high internal moisture content are placed on such prior cooling trays, disfiguring sweat marks are produced in the areas of contact with the supporting elements, the crusts of the loaves being so softened by moisture absorption in the marked areas that the loaves frequently collapse when subsequently sliced in slicing machines.

A primary object of the present invention is to provide a bread cooling tray which avoids the foregoing difficulties.

The sweat marks discussed above are due to excessive absorption of moisture by the crusts of the loaves in the areas of contact with the supporting elements. We have discovered that the disfiguring and damaging sweat marks produced with prior cooling trays are apparently due to two principal factors, and another object of the present invention is to provide a bread cooling tray which eliminates these detrimental factors.

The first principal factor mentioned above is that the moisture exuded by the loaves cannot evaporate freely when the loaves are supported by such relatively wide supporting elements as slats or ribs because of the fact that cooling air cannot reach the areas of the loaves in contact with such supporting elements. Further, if such relatively wide supporting elements are also deep, which is characteristic of the cooling trays employed heretofore, substantial resistance to air circulation is produced. Consequently, since the moisture exuded by the loaves in the areas of contact with such prior supporting elements cannot evaporate, it is absorbed by the crusts of the loaves with the result that the loaves are disfigured and structurally weakened.

Considering the second principal factor discussed above, the supporting elements upon which the loaves of bread are placed to be cooled are, initially, at least, cooler than the loaves, and thus tend to prevent or retard evaporation in the contact areas at least until such time as the supporting elements are heated above the dew point of the atmosphere at the point of contact by extraction of heat from the loaves. Actually, such relatively wide and massive supporting elements tend to condense considerable moisture which has been evaporated thereadjacent until such time as they are heated approximately to the surface temperature of the loaves. With relatively wide and deep supporting elements, the time required for heating them is sufficient to result in excessive condensation, the condensate so produced being absorbed by the loaves and disfiguring and weakening the loaves in the areas of contact.

An important object of the present invention is to provide a bread cooling tray which eliminates the foregoing factors by providing adequate circulation of air around the loaves of bread and by minimizing condensation and retarded evaporation effects produced by prior supporting elements.

More particularly, an important object of the present invention is to provide a bread cooling tray wherein the supporting elements are small rods or wires, the term "rods" being used hereinafter for convenience. We have discovered that supporting rods having a maximum cross-sectional dimension not exceeding three thirty-seconds inch, and preferably of the order of magnitude of one-sixteenth inch, will provide adequate air circulation and will prevent condensation and retarded evaporation to such an extent that loaves cooled thereon are subjected to substantially no disfiguring and structural weakening, which is an important feature of the invention. As a practical matter, the rods preferably comprise round wires of a diameter not exceeding three thirty-seconds inch and preferably of the order of magnitude of one-sixteenth inch, although it is contemplated that cross sections other than circular may be employed. For example, diamond-shaped rods having similar maximum cross-sectional dimensions might be employed.

Considering the effects of using such small rods, in the first place, their small size minimizes the areas of contact between the loaves and the rods so that moisture exuded by the loaves can evaporate freely. Also, such small rods permit adequate air circulation, particularly since the rods are of shallow depth, as well as of narrow width.

Secondly, such small rods have very little mass so that they extract very little heat from the loaves in being heated to the surface temperature of the loaves. Consequently, very little moisture is condensed by such small rods within and on the surface of the bread and moisture absorption by the loaves is therefore minimized.

Considering further the matter of heat extraction from the loaves by such small wires, the condensing effects thereof may be further minimized by forming the wires of a material having a low specific heat and/or a low conductivity. By forming the wires of a material having a low specific heat, the amount of heat which must be extracted from the loaves to heat the wires is minimized since a material having a low specific heat requires a small amount of heat per unit mass to elevate its temperature a given extent, as compared to materials having high specific heats. Also, by forming the wires of a material having a low conductivity, the wires extract heat from the loaves at a lower rate so that the loaves are not cooled rapidly in the areas of contact, whereby condensation is further minimized. As a practical matter, we prefer to employ metal for the supporting rods, any of several metals having a low specific heat and low conductivity being suitable. However, nonmetallic materials having sufficient strength to support the loaves of bread may also be employed if desired, such nonmetallic materials also preferably having as low a specific heat and as low a conductivity as possible.

In order to provide adequate support for the loaves of bread with such small rods, an object of the invention is to provide a rod spacing which is sufficiently small to provide the support desired, but which is not so small as to interfere with proper air circulation. The maximum center-to-center spacing between the rods should not exceed one-half inch for structural reasons, and should not be much less than one-quarter inch to avoid interfering with proper air circulation. We have found that bread cooling trays having the desirable characteristics discussed above may be attained by employing approximately one-sixteenth inch rods with a center-to-center spacing of about one-quarter to one-half inch.

In general, the cooling tray of the present invention includes a supporting wall for such baked goods as loaves of bread which is normally positioned substantially horizontally, and includes a rear wall which extends upwardly from the supporting wall adjacent the rear side of the tray. The cooling tray may be suspended from a cooling conveyor and is preferably so mounted on the cooling conveyor that the supporting wall is inclined downwardly toward the rear of the tray at a slight angle. Thus, the rear wall of the cooling tray acts as a seat or stop for the loaves of bread and prevents them from sliding off the rear side of the tray, the rearward inclination of the supporting wall of the tray preventing the loaves from sliding off the front side of the tray until such time as the tray is tilted to dump the loaves.

Another important object of the invention is to provide a cooling tray of the foregoing general character wherein the supporting and rear walls are defined by a plurality of substantially parallel, continuous rods extending between the front and rear sides of the tray and having the characteristics discussed above.

Another object of the invention is to provide a cooling tray which includes a frame having spaced front and rear sides and which includes a plurality of spaced, substantially parallel rods which are carried by the frame, the rods having transverse supporting sections which substantially span the space between the front and rear sides of the frame and which cooperate to form the supporting wall for the loaves of bread, and the rods having rear sections respectively integral with the supporting sections thereof which extend upwardly from the supporting wall of the tray and cooperate to define a rear wall for preventing the loaves of bread from sliding off the rear side of the tray.

Another important object is to provide such a cooling tray wherein the aforementioned rods are arranged in a plurality of groups or units of interconnected rods which are detachably connected to the frame so that they may be removed and replaced individually.

More particularly, an object of the invention is to provide a cooling tray wherein the rod units are composed of rods interconnected by connecting elements which extend transversely of the rods and which are detachably connected to the frame.

Another object is to provide a cooling tray wherein the connecting elements of the rod units are secondary rods having hooked ends some of which are adapted to be hooked over elements of the frame and others of which are adapted to be inserted into holes in the front and rear sides of the frame.

Another object is to provide a cooling tray wherein the rods which support the loaves of bread have end sections respectively bent downwardly over the front side of the frame and rearwardly over the rear side of the frame to provide the supporting and rear walls defined thereby with smooth edges to avoid damage to the loaves of bread.

An important advantage of the present invention is that the rods forming the supporting and rear walls of the cooling tray provide an open construction through which any crumbs dislodged from the loaves of bread may fall readily, there being no corners, or the like, to accumulate bread crumbs.

The foregoing objects and advantages of the present invention, together with various other objects and advantages thereof which will become apparent, may be attained with the exemplary embodiment of the invention which is illustrated in detail in the accompanying drawings and which is described in detail hereinafter. Referring to the drawings:

Fig. 1 is a perspective view of a tray of the character described which embodies the invention;

Fig. 2 is an end view of the tray of the invention as suspended from a cooling conveyor;

Figs. 3, 4, 5 and 6 are views respectively taken as indicated by the arrows 3—3, 4—4, 5—5 and 6—6 of Fig. 1; and Fig. 7 is a plan view of a rod unit of the invention.

Referring particularly to Fig. 1 of the drawings, the tray of the invention includes a rectangular frame 11 having front and rear sides 12 and 13. The front side 12 of the frame is defined by a frame member having a generally vertical flange 14 and a rearwardly extending flange 15 integral therewith, this frame member extending the entire length of the rectangular frame 11. The rear side 13 of the frame is similarly defined by a frame member having a generally vertical web 16, the latter having along its upper edge a downwardly and forwardly extending flange 17 and an upwardly and rearwardly extending flange 18, and having adjacent its lower edge a rearwardly extending flange 19.

The frame members defining the front and rear sides 12 and 13 of the rectangular frame 11 are interconnected intermediate their ends by frame elements 23, exemplified as rods, which are arranged in spaced, substantially parallel relation. As best shown in Fig. 3, each frame element 23 is connected at its front end to the flange 14 of the front frame member by a screw 24, or the like, and is connected at its rear end to the web 16 of the rear frame member by inserting a threaded portion thereof through a hole in the web and by threading a nut 25 onto such threaded portion. Each frame element 23 is provided with a shoulder 26 against which the web of the rear frame member seats, and, since the front end of each frame element 23 seats against the flange 14 of the front frame member, the frame elements thus maintain the desired spacing between the front and rear frame members.

The rectangular frame 11 is also provided with ends 29 defined by plate-like end frame members each having lugs 30 and 31 thereon which are bolted, or otherwise connected, to the front and rear frame members, as best shown in Fig. 3 of the drawings. The ends 29 of the frame 11 are respectively provided with pivot means, exemplified as pivot pins 32, by means of which the tray may be suspended from a cooling conveyor, as by employing each of the pivot pins 32 as one pivot pin of a roller type conveyor chain 33, as illustrated in Fig. 2 of the drawings. If desired, the aligned pivot pins 32 may be so located that the tray is inclined rearwardly and downwardly at a slight angle when loaded, as suggested in Fig. 2 of the drawings. Each end 29 of the frame 11 also carries rollers 34 which may engage cams, or the like, not shown, which rotate the tray forwardly about the pivot axis defined by the pivot pins 32 to dump the loaves of bread over the forward side 12 of the tray after they have been cooled to the desired extent.

As best shown in Fig. 1 of the drawings, the cooling tray is provided with a generally horizontal supporting wall 41 on which the loaves of bread rest, and is provided with a generally vertical rear wall 42 which acts as a stop for loaves of bread placed on the supporting wall 41. Thus, when loaves of bread are placed on the tray by sliding them rearwardly onto the supporting wall 41 thereof, the rear wall 42 acts to prevent the loaves from sliding off the rear side 13 of the tray, and also acts to prevent the loaves from sliding off the rear side during movement of the trays through a cooling chamber, not shown.

The supporting and rear walls 41 and 42 of the tray are defined by a plurality of rod groups or rod units 43 which are detachably connected to the frame 11, each rod unit 43 defining part of the supporting wall 41 and part of the rear wall 42. As best shown in Fig. 7 of the drawings, each rod unit includes a plurality of primary rods 44 which extend transversely of the rectangular frame 11, i. e., which extend between the front and rear sides 12 and 13 thereof. The primary rods 44 are arranged in spaced, substantially parallel relation, being sufficiently close together to provide adequate support for loaves of bread and being sufficiently small to minimize interference with the circulation of cooling air around the loaves and to minimize condensation effects, all as hereinbefore discussed.

As best shown in Fig. 3 of the drawings, each of the primary rods 44 includes a generally vertical section 45 at its forward end which is bent downwardly over the front side 12 of the frame 11, includes a generally horizontal, supporting section 46 which substantially spans the space between the front and rear sides 12 and 13 of the frame, includes a generally vertical, rear section 47 adjacent the rear side of the frame which extends upwardly from the supporting section 46 thereof, and includes a generally horizontal section 48 adjacent its rear end which is bent over the rear side 13 of the frame, the sections 45 to 48 of each primary rod being integral. The primary rods 44 of each rod unit 43 are interconnected by connecting elements, illustrated as secondary rods 52a, 52b, etc., which are disposed beneath and extend transversely of the primary rods of such rod unit and which are arranged in spaced, substantially parallel relation. Preferably, the primary rods of each rod unit 43 are welded to the secondary rods thereof.

As best shown in Figs. 1, 3 and 4 of the drawings, one of the secondary rods of each rod unit 43, designated by the reference character 52a, interconnects the forward end sections 45 of the primary rods 44 of such unit and is provided with hooked ends 53a inserted into holes 54a in the front side 12 of the frame. Several of the secondary rods of each rod unit, designated by the reference character 52b, interconnect the supporting sections 46 of the primary rods of such rod units and are provided with hooked ends 53b which are hooked over the frame elements 23, as best shown in Figs. 1, 3, 5 and 6 of the drawings. Referring particularly to Figs. 1 and 3 of the drawings, the rear sections 47 of the primary rods 44 of each rod unit 43 are interconnected by one of the secondary rods which has been designated by the reference character 52c. Finally, as best shown in Figs. 1, 3 and 5 of the drawings, the rearward end sections of the primary rods 44 of each rod unit 43 are interconnected by one of the secondary rods which has been designated by the reference character 52d, the latter having hooked ends 53d which are inserted in holes 54d in the rear side 13 of the frame 11.

As will be apparent, the rod units 43 may be mounted on the frame 11 readily by merely placing them on the frame with the hooked ends 53a and 53d inserted into the corresponding holes 54a and 54d, and with the hooked ends 53b hooked over the corresponding frame elements 23. Similarly, the rod units may be removed readily for cleaning, or the like. If desired, the hooked ends 53b may be clinched slightly, as indicated in dotted lines in Figs. 4 and 6, to secure the rod units more positively.

Even when the hooked ends 53b are clinched slightly in this manner, they will spring sufficiently to permit removal of the rod units.

As will be apparent, the relatively closely spaced primary rods 44 will provide adequate support for the loaves of bread. However, the close spacing of the primary rods does not interfere with the desired air circulation around the loaves of bread because of the relatively small rods employed and the small rods minimize condensation effects.

Another advantage of the tray of the invention is that the rod units 43 are of open construction, and, consequently, any crumbs dislodged from the loaves of bread fall through the spaces between the rods and do not accumulate on the tray.

Another advantage is that, by breaking the supporting and rear walls 41 and 42 of the tray down into the rod units 43, manufacture of the tray is considerably simplified since the rod units are of such size that they may be handled readily in welding or otherwise securing the secondary rods to the primary rods. As previously indicated, assembly of the rod units 43 with the frame 11 is a simple matter.

The foregoing exemplary embodiment of the present invention is subject to modification without necessarily departing from the spirit of the invention.

The invention is defined by the following claims:

1. A tray for supporting such articles as loaves of bread being cooled and having front and rear members, said tray having a supporting wall for such articles as loaves of bread which extends from said front member of said tray substantially to said rear member, and having a rear wall which extends upwardly from said supporting wall along and in spaced relation with respect to said rear member of said tray and which is adapted to prevent the articles from contacting the rear member of said tray, said supporting and rear walls being formed by a plurality of spaced, substantially parallel, continuous rods which extend from said front member of said tray substantially to said rear member and which are bent upwardly at the junction of said supporting and rear walls.

2. In a tray for supporting such articles as loaves of bread being cooled, the combination of: a frame having spaced front and rear sides; a plurality of groups of spaced, substantially parallel rods, each of said rods having a transverse supporting section which substantially spans the space between said front and rear sides of said frame, and having a rear section which extends upwardly from said supporting section thereof adjacent said rear side of said frame, said supporting sections of said rods cooperating to form a supporting wall for such articles as loaves of bread, and said rear sections thereof cooperating to form a rear wall against which such articles are adapted to seat; and means interconnecting said rods of said groups into coherent units.

3. In a tray for supporting such articles as loaves of bread being cooled, the combination of: a frame having spaced front and rear sides; a plurality of groups of spaced, substantially parallel rods, each of said rods having a transverse supporting section which substantially spans the space between said front and rear sides of said frame, and having a rear section which extends upwardly from said supporting section thereof along and in spaced relation with respect to said rear side of said frame, said supporting sections of said rods cooperating to form a supporting wall for such articles as loaves of bread, and said rear sections thereof cooperating to form a rear wall against which such articles are adapted to seat; rod means interconnecting said rods of each of said groups into coherent units; and means for securing said rod means to said frame.

4. A tray according to claim 3 wherein said rods have end sections respectively bent over said front and rear sides of said frame.

5. A tray according to claim 2 wherein the rods of each of said rod units are interconnected by a plurality of spaced, substantially parallel connecting elements each of which is provided with hooked ends engaging said frame.

6. A tray as defined in claim 5 wherein said frame is provided with transverse frame elements spanning the space between and connected to said front and rear sides of said frame, and wherein said front and rear sides of said frame are provided with holes therein, some of said hooked ends of said connecting elements being hooked over said frame elements, and the other hooked ends of said connecting elements being inserted into said holes.

7. A tray as defined in claim 1 wherein the spacing of said rods is not more than approximately one-half inch and the diameters thereof are not more than approximately three thirty-seconds inch.

8. A tray in accordance with claim 2, wherein said last named means is adapted for securing said groups of rods as units to said frame.

References Cited in the file of this patent

UNITED STATES PATENTS

| Number | Name | Date |
|---|---|---|
| 834,037 | Arthur | Oct. 23, 1906 |
| 1,171,486 | Warner | Feb. 15, 1916 |
| 1,270,540 | Morse | June 25, 1918 |
| 1,428,721 | Towne | Sept. 12, 1922 |
| 1,680,441 | Adams | Aug. 14, 1928 |
| 1,768,534 | Aiken | July 1, 1930 |
| 2,262,172 | Engels et al. | Nov. 11, 1941 |
| 2,458,113 | Stevens | Jan. 4, 1949 |